May 22, 1951 — H. SKREBERG — 2,553,728
COLLAPSIBLE BIN
Filed Jan. 21, 1949

Inventor:
HANS SKREBERG

Patented May 22, 1951

2,553,728

UNITED STATES PATENT OFFICE 2,553,728

COLLAPSIBLE BIN

Hans Skreberg, Big Bend Township, Chippewa County, Minn.

Application January 21, 1949, Serial No. 71,821

1 Claim. (Cl. 150—49)

This invention relates to collapsible bins, containers, or tanks.

An object of my present invention is to provide a bin, container, or tank, that may be easily and quickly set up from a collapsed condition, and transported or moved from place to place, particularly for use on farms and in fields when grains or seeds are harvested.

Another object of my invention is to minimize the distance of travel of trucks or wagons employed to empty machines used to cut and thresh the grain or other crops in the field, or to pick the grain or other crops from a swath and thresh it, by placing these bins, containers, or tanks at suitable intervals throughout the field to supplement the holding capacity of the trucks or wagons.

I have taken into consideration inclemencies of weather versus crops left in the field stored for shorter or longer periods in the bins or tanks, and either the small or larger sizes of these bins or tanks can be readily "roofed" to protect against rain, wind, or snow. Such top or "roof" for small size bin or tank, having a material such as canvas, can be tied like a sack, and the larger sizes provided with water-shedding "roof" as an extra part.

Referring now to the drawings.

Figure 1:
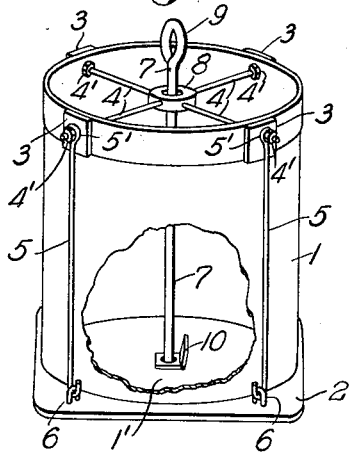
Fig. 1 is a perspective view of a now preferred embodiment of my invention showing a combination bag and frame with a portion cut away to show a central rod connection therein.
Figure 2:
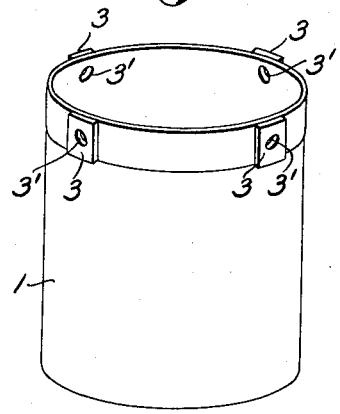
Fig. 2 is a perspective view of the bag alone.
Figure 4:
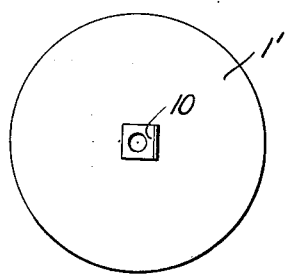
Fig. 4 is a top plan view of the bottom of the bag.
Figure 3:
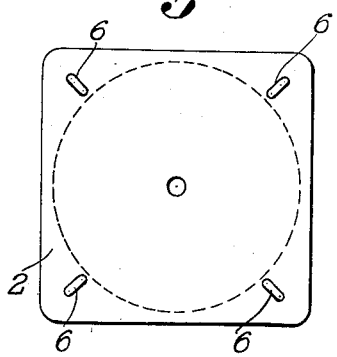
Fig. 3 is a top plan view of a platform member of the frame with the position of the bag when in place on the platform member shown in phantom.
Figure 5:
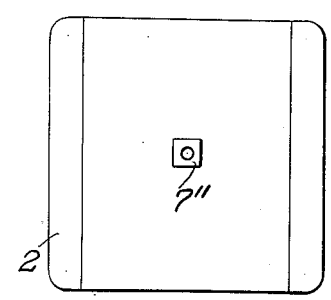
Fig. 5 is a bottom plan view of the platform member.
Figure 8:
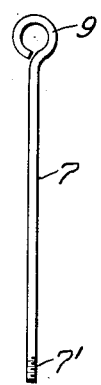
Fig. 8 is an elevational view of a central rod of the frame.
Figure 6:
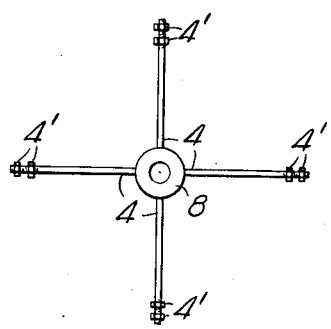
Fig. 6 is a plan view of a spider member of the frame.
Figure 7:
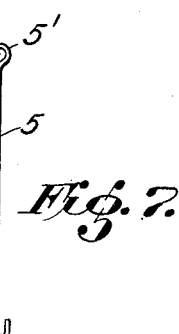
Fig. 7 is an elevational view of one of the outer rods of the frame.

The bin, container, or tank comprises a bag 1 which rests on a platform 2, and has, preferably, four lugs or ears 3 secured to its upper edge. Lugs 3 have holes 3', into which threaded ends of a spider part 4 are inserted. Rod members 5, that hook into staples 6 in the platform 2, have eyelets 5' at their upper ends that engage ends of members 4, and are held in place by nuts 4'. A central rod 7 having a threaded lower end 7' and a loop at upper end passes through a hole in the central part of bottom of the bag 1, and through a hole in central part of platform 2, and a nut 7'' secures said rod so that it cannot be pulled out of platform hole. The spider member 4 has an apertured plate 8 into which the upper end of rod 7 is passed. The loop 9 at upper end of rod 7 provides handle means whereby the entire assembly can be lifted by a simple crane having a cable and hook.

While the drawing and description herein particularly applies to a bin of minimum capacity having a bag that is made of a collapsible material such as canvas, the identical design and construction applies to larger bins where non-collapsible materials are used for the bag 1.

A flap or valve 10, shown in the cutaway portion in Fig. 1 forms a seal for the hole in the bottom of the bag 1 when the rod 7 is withdrawn from the platform 2. The member 4, and the rods or members 5 can be removed from the platform and bin or "sack" after the bag is filled with grain or other commodity.

It is believed that my description, in connection with drawings, of the invention is plain and complete and will enable those skilled in the arts to which said invention appertains to make and use the same.

I claim:

A storage bin comprising a cylindrical shaped bag adapted to be placed on a platform member, said cylindrical shaped bag having a flat circular bottom portion with a hole in its center and a flap adapted to close said hole, a plurality of staples secured to said platform member, rods extending upwardly from said staples, said rods hooking into the staples by their lower ends and having eyes at their upper ends to engage a spider member having threaded-end rods, and engaging lugs in an upper edge of the bag member, a central rod having a loop in an upper end thereof, and having a threaded lower end adapted to pass through the hole in the central part of said circular bottom portion of the bag and through a central hole in said platform member and locked to the platform member by means of a nut on the under side of the platform, the intermediate portion between the loop and the threaded lower end of the central rod passing through a hole in the center of the spider member, nuts adapted to retain the lugs on said bag and the upper ends of the platform rods from displacement.

HANS SKREBERG.

REFERENCES CITED

The following references are of record in the file of this patent:

UNITED STATES PATENTS

| Number | Name | Date |
|---|---|---|
| 1,052,378 | Ranken | Feb. 4, 1913 |
| 1,313,446 | Wright | Aug. 19, 1919 |
| 2,314,639 | West et al. | Mar. 23, 1943 |